US012651874B2

(12) United States Patent
Lim et al.

(10) Patent No.: US 12,651,874 B2
(45) Date of Patent: Jun. 9, 2026

(54) CONNECTOR WITH EMBEDDED FILTER

(71) Applicant: ELECTRONIC DEVICE SOLUTION INC., Daejeon (KR)

(72) Inventors: Byeong Ok Lim, Daejeon (KR); Sung Chan Kim, Daejeon (KR); Joo Seoc Go, Daejeon (KR); You Na Ji, Daejeon (KR)

(73) Assignee: ELECTRONIC DEVICE SOLUTION INC., Daejeon (KR)

( * ) Notice: Subject to any disclaimer, the term of this patent is extended or adjusted under 35 U.S.C. 154(b) by 391 days.

(21) Appl. No.: 18/271,659

(22) PCT Filed: Mar. 12, 2021

(86) PCT No.: PCT/KR2021/003061

§ 371 (c)(1),
(2) Date: Jul. 10, 2023

(87) PCT Pub. No.: WO2022/181867

PCT Pub. Date: Sep. 1, 2022

(65) Prior Publication Data

US 2024/0322504 A1 Sep. 26, 2024

(30) Foreign Application Priority Data

Feb. 26, 2021 (KR) ........................ 10-2021-0026529

(51) Int. Cl.
*H01R 13/719* (2011.01)
*H01R 13/7197* (2011.01)

(52) U.S. Cl.
CPC ....... *H01R 13/719* (2013.01); *H01R 13/7197* (2013.01)

(58) Field of Classification Search
CPC .... H01R 13/719; H01R 13/7197; H01P 1/202
See application file for complete search history.

(56) References Cited

U.S. PATENT DOCUMENTS

| | | | | |
|---|---|---|---|---|
| 3,329,911 | A | 7/1967 | Schlicke et al. | |
| 6,180,877 | B1 | 1/2001 | Lamesch et al. | |
| 6,778,044 | B2 * | 8/2004 | Fehrenbach | H01R 13/025 333/260 |

(Continued)

FOREIGN PATENT DOCUMENTS

| | | |
|---|---|---|
| EP | 2127017 | 12/2009 |
| JP | 5741004 | 3/1982 |

(Continued)

OTHER PUBLICATIONS

Extended European Search Report dated Jul. 8, 2024, issued in European Application No. 21928164.9.

(Continued)

*Primary Examiner* — Renee S Iuebke
*Assistant Examiner* — Paul D Baillargeon
(74) *Attorney, Agent, or Firm* — PnK IP LLC

(57) ABSTRACT

A connector with an embedded filter is provided. The connector includes a body having an inner side thereof provided with a space, an insulator provided at the inner side of the body, and a pin provided inside the insulator. The pin has a concavo-convex multistage structure of at least two stages having different heights.

8 Claims, 3 Drawing Sheets

(56) References Cited

U.S. PATENT DOCUMENTS

| | | | | |
|---|---|---|---|---|
| 8,810,339 | B2 * | 8/2014 | Bernhardt | H01P 1/202 333/206 |
| 9,240,620 | B2 * | 1/2016 | Nita | H01P 3/06 |
| 2003/0001697 | A1 | 1/2003 | Bennett et al. | |
| 2010/0127801 | A1 * | 5/2010 | Adkins | H01P 1/202 333/206 |
| 2018/0123298 | A1 | 5/2018 | Zhang et al. | |

FOREIGN PATENT DOCUMENTS

| | | | |
|---|---|---|---|
| JP | 6691072 | B2 | 4/2020 |
| KR | 10-2000-0046296 | A | 7/2000 |
| KR | 10-2006-0065682 | A | 6/2006 |
| KR | 10-2010-0104810 | A | 9/2010 |
| KR | 101898945 | B1 | 9/2018 |
| WO | 2008/085283 | | 7/2008 |
| WO | 2022-181867 | A1 | 9/2022 |

OTHER PUBLICATIONS

International Search Report dated Nov. 22, 2021, issued in International Patent Application No. PCT/KR2021/003061.
Written Opinion dated Nov. 22, 2021, issued in International Patent Application No. PCT/KR2021/003061.

* cited by examiner

CONNECTOR WITH EMBEDDED FILTER

CROSS REFERENCE TO RELATED APPLICATIONS

This application is a National Stage Entry of International Patent Application No. PCT/KR2021/003061, filed on Mar. 12, 2021, which claims priority from and the benefit of Korean Patent Application No. 10-2021-0026529, filed on Feb. 26, 2021, each of which is hereby incorporated by reference for all purposes as if fully set forth herein.

BACKGROUND

Field

The present disclosure relates to a connector with an embedded filter, and more specifically, to an economical connector in which the connector has a filter function, thereby being capable of miniaturizing a module and simplifying a structure thereof.

Discussion of the Background

Currently, electromagnetic wave filters are used in many audio devices, communication devices, signal processing, and so on. Electromagnetic wave filters are used for voice amplification and equalization in audio devices, are used for specific frequency tuning and removing of other frequency ranges in communication devices, and are used for anti-aliasing (smoothing function) in signal processing.

In electromagnetic wave filters, for example, when a low pass filter is manufactured with an inductor and a capacitor, a power supply and the inductor are connected in series, and the capacitor is connected in parallel. After such low pass filter manufactured as described above is implemented as an adapter and is surrounded by a housing, a first end of the low pass filter may be connected to a terminal of a wall body and a second end of the low pass filter may be connected to an antenna.

In Korean Patent No. 10-1898945 "ADAPTER HAVING LOW PASS FILTER" illustrated in FIG. 5 as a related art, an adapter provided with a first body 110, a second body 120, a middle insulator 210, scaling insulators 220 and 230, and terminal portions 330 and 332 is proposed. A coaxial core wire 310 for an inductor having a large diameter is arranged such that three coaxial core wires 310 are arranged in series and are surrounded by the middle insulator 210, and a coaxial core wire 320 for a capacitor having a small diameter is arranged such that four coaxial core wires 320 are also connected in parallel and are surrounded by the middle insulator 210.

In U.S. Patent Application Publication No. 2003-0001697A1, a low pass filter which does not have a lumped element structure mounted on a PCB and which has the same structure as in the Korean Patent in which an inductor element and a capacitor element are alternately arranged is proposed.

In addition to such a low pass filter, several filters such as a middle band filter, a high frequency band filter, and so on are used in various radio frequency communication modules.

The above information disclosed in this Background section is only for understanding of the background of the inventive concepts, and, therefore, it may contain information that does not constitute prior art.

SUMMARY

Applicant recognized that since a filter structure is implemented mostly in an adapter, the adapter has a complicated structure and a connection structure with other electronic components such as a connector and so on is required to be considered, so that there is a disadvantage that the scope of the design is limited and the cost is increased.

In order to solve the problem, the inventor of the present disclosure has developed a connector having a new and advanced structure in which the connector, not an adapter, has a filter function.

Accordingly, an objective of the present disclosure is to provide a connector in which a filter is embedded, thereby being capable of performing a function of passing a desired frequency band.

Additional features of the inventive concepts will be set forth in the description which follows, and in part will be apparent from the description, or may be learned by practice of the inventive concepts.

According to an aspect of the invention, a connector with an embedded filter, the connector includes: a body having an inner side thereof provided with a space; an insulator provided at the inner side of the body; and a pin provided inside the insulator, the pin having a multistage structure of at least two stages having different heights.

The insulator may be configured such that an inner surface of the insulator facing the pin has a bump structure so as to complementary to the multistage structure of the pin.

The pin and the insulator may be accommodated and inserted by predetermined lengths into the space formed at the inner side of the body, and remaining portions of the pin and the insulator may be exposed outside.

The body may extend such that the body covers at least an entire length of the insulator.

The pin having the multistage structure may be divided into a plurality of pins, and each of the pins divided may be spaced apart from each other by a predetermined distance.

A front side of the insulator may extend further frontward than corresponding portions of the body and the pin such that an exposed portion is formed, a cap portion may be formed such that the cap portion surrounds an outer side of the exposed portion, and a plug or a jack may be mounted from a cross-section of the pin to an end of the exposed portion.

Since the connector of the present disclosure has the filter function, the module may be miniaturized, the structure may be simplified, and the cost may be reduced.

In the connector of the present disclosure, a desired frequency band may be passed by adjusting the filter function by changing the structure and the shape of the pin.

The connector of the present disclosure may be utilized for various purposes such as enabling direct connection between connectors by adopting a portion of the adapter structurally.

Other features and other advantages of the present disclosure will be more clearly understood from the description below.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
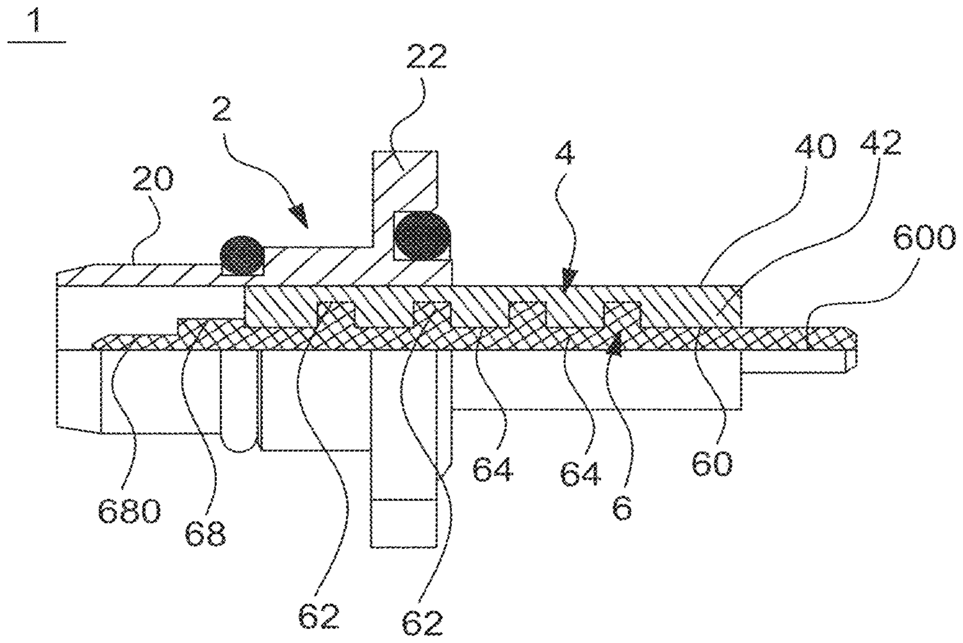
FIG. 1 is a cross-sectional view illustrating a connector with an embedded filter of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In a communication module or a communication assembly in which a connector and another connector are connected to each other or a connector and an adapter are connected to each other, which component has a filter function is an important issue.

In the related art, an adapter has a filter structure, but the biggest feature of the present disclosure is that a connector has a filter structure therein.

In a broad aspect including the technical field of the present disclosure, a connector is a member that connects electronic devices to each other, and there are various types of adapters such as an adapter spaced apart from the connector and connected to the connector, an adapter in which the connector is embedded, an adapter accommodating a portion of a configuration of the connector, and so on. Furthermore, as the connector is physically or functionally distinguished from the adapter, the connector described in the present disclosure is not limited to a specific structure or use, and the following embodiments do not limit the scope of the present disclosure.

Hereinafter, an exemplary embodiment of the present disclosure will be described with reference to accompanying drawings.

FIG. 1 is a cross-sectional view illustrating a connector 1 with an embedded filter of the present disclosure. In the present disclosure, the connector 1 in a BMA (blind mate) type, which is widely used for wireless and microwave transmission, is exemplified, but other connectors such as an MBX connector and an MMBX connector that are used for board-to-board connection, a DIN connector and an SMB connector used in the RF field, and so on are also capable of being applied in the present disclosure, but the types of the connector do not limit the scope of the present disclosure.

From the outside, the connector 1 with the embedded filter includes a body 2, a dielectric or an insulator 4 inside the body 2, and a pin 6 inside the insulator 4.

The body 2 includes a sleeve 20 having a slender cylindrical shape that extends from a first side (frontward) to a second side (rearward), and includes a flange 22 which protrudes integrally from a second end portion of the sleeve 20 and which has a diameter larger than a diameter of the sleeve 20. A groove for mounting an O-ring is formed in a middle portion in a length of the sleeve 20 and in a middle portion in a height of the flange 22. The body 2 is an exposure type body in which a predetermined length of the pin 6 and a portion of the insulator 4 are accommodated therein and other portions of the pin 6 and the insulator 4 are exposed to the outside. An inner portion of the body 2 provides a space having a constant diameter, and the insulator 4 and the pin 6 are inserted into the space and accommodated.

Although an inner surface of the pin 6 of the present disclosure provides a space having a constant diameter, an outer surface 60 has a three-stage structure including a first surface 62 that most protrudes outward toward the body 2, a second surface 68 that protrudes next most, and a third surface 64 that protrudes the innermost. A middle portion of the pin 6 has a concavo-convex structure in which the third surface 64 and the first surface 62 are alternately repeated, the second surface 68 at the front of the structure forms an upper surface of a step supporting the insulator 4, a front sleeve 680 extends further frontward, and a rear sleeve 600 extends further rearward. The front sleeve 680 may have a height difference with the third surface 64 or may have a height equal to a height of the third surface 64.

Conventionally, a pin mounted in a connector has a cylindrical shape in which inner and outer surfaces of the pin have uniform diameters. However, in the present disclosure, the outer surface of the pin 6 is formed in a multistage structure, and the insulator 4 is mounted therebetween, thereby realizing a filter function.

Specifically, the insulator 4 is formed in a shape that is coupled to and complementary to the structure of the pin 6. Therefore, as illustrated in the drawing, a lower surface 42 of the insulator 4 has a shape in which a bump is repeated so that the lower surface 42 of the insulator 4 is sequentially in contact with the third surface 64 and the first surface 62 of the pin 6. An upper surface 40 of the insulator 4 has a constant diameter along a longitudinal direction of the insulator 4 so that the upper surface 40 is in contact with an inner surface of the body 2. A first end portion of the insulator 4 may be supported by the step of the pin 6, and a second side of the insulator 4 may extend rearward while the second side of the insulator 4 is in contact with the rear sleeve 600 so that the second side of the insulator 4 is formed by a predetermined length of the rear sleeve 600.

The connector 1 with the embedded filter of the present disclosure performs the filter function by an interaction of the insulator 4 with the pin 6. Since a portion of the insulator 4 mounted between the first surface 62 of the pin 6 and the inner surface of the body 2 is thin and a portion of the insulator 4 mounted between the third surface 64 and the inner surface of the body 2 is thick, a capacitor element and an inductor element may be alternately provided. Control variables such as capacitance, inductance, and so on may be adjusted by changing the thickness, the height, or the length of each portion of the pin 6, and by changing the structure of the insulator 4 according to the thickness, the height, or the length of each portion of the pin 6, only a desired frequency band may be passed.

Although the pin 6 is described that the pin 6 has the three-stage structure, the pin 6 may have a two-stage structure or may have a four-stage structure or more, and the thickness and the number of each stage may be changed. The insulator 4 is not always mounted such that the insulator 4 is in contact with the two members that are the body 2 and the pin 6, and a portion of the insulator 4 may be spaced apart from the two members or a portion of the insulator 4 may be removed according to a filter function.

Since the connector 1 with the embedded filter of the present disclosure acts as a filter, a separate filter is not required to be provided when a transmitting and receiving module is manufactured, so that effects of a module miniaturization, a structural simplification, and an economical cost reduction may be expected.

Figure 2:
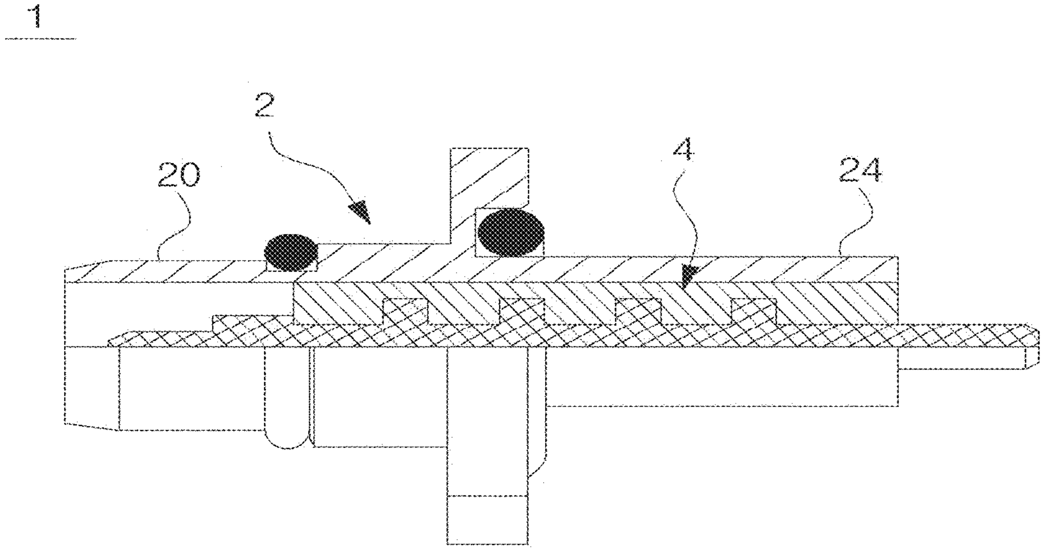
FIG. 2 is a cross-sectional view illustrating another embodiment of the connector with the embedded filter in FIG. 1.

FIG. 2 is a cross-sectional view illustrating another embodiment of the connector 1 with the embedded filter in FIG. 1. The difference from FIG. 1 is that a rear sleeve 24 which extends rearward behind the flange 22 of the body 2 is formed, and a second end portion of the rear sleeve 24 at least covers the insulator 4. The rear sleeve 600 of the pin 6 is also accommodated inside the body 2 except for a required exposed portion.

The connector 1 in FIG. 2 may be referred to as a "shield type" compared to the connector 1 in FIG. 1. A user may select any one of a structure that exposes a portion of the insulator 4 or a structure that covers all portions of the insulator 4, so that the range of use may expand and the usage may vary. When a cable assembly is manufactured by combining the connector 1 of the present disclosure with a cable, the connector 1 in FIG. 2 may be selected to prevent damage or deformation of the insulator 4 during assembly. Then, the insulator 4 may be protected and stability of the pin 6 may be secured. Meanwhile, when the connector 1 of the present disclosure is coupled to an apparatus such as a housing and is connected to a PCB, the connector 1 in FIG. 1 may be selected since the insulator 4 may be sufficiently protected by the apparatus during assembly.

Figure 3:
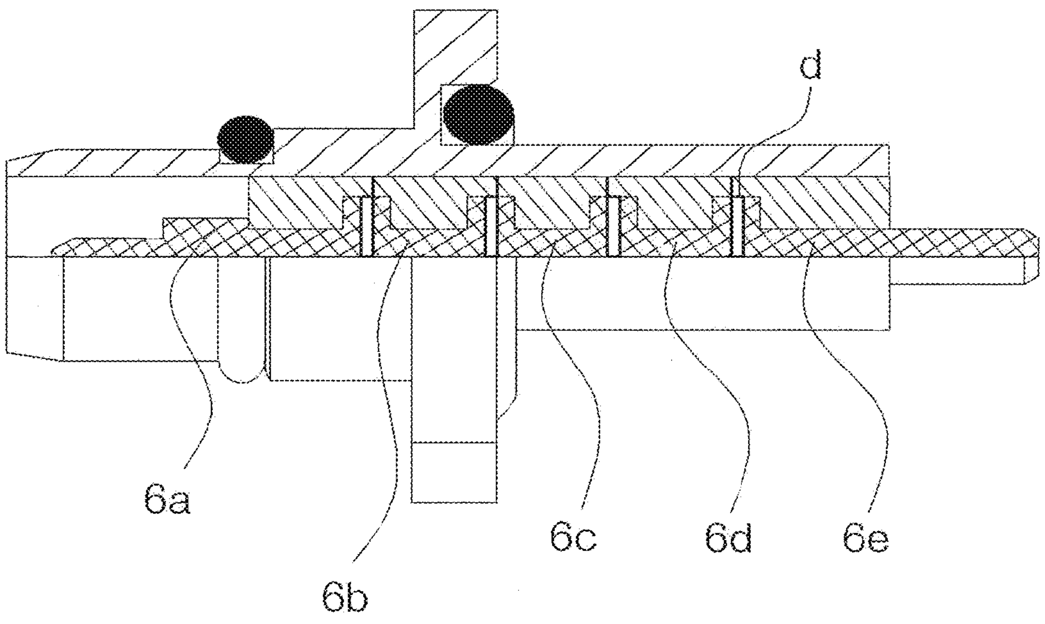
FIG. 3 is a cross-sectional view illustrating a still another embodiment of the connector with the embedded filter of the present disclosure.

FIG. 3 is a cross-sectional view illustrating a still another embodiment of the connector 1 with the embedded filter of the present disclosure.

The difference from the previous embodiment is that the pin 6 is not manufactured as an integrated type, but is divided into five portions 6*a*, 6*b*, 6*c*, 6*d*, and 6*e*, for example, and the five portions are separately mounted. There is a predetermined distance d between each of the portions 6*a*, 6*b*, 6*c*, 6*d*, and 6*e*. As illustrated the drawing, the insulator 4 may be separately mounted according to each of the portions 6*a*, 6*b*, 6*c*, 6*d*, and 6*e*, but may be manufactured as an integrated type. In addition, the insulator 4 may not be interposed between regions where the distance d is formed.

Since the embodiment in FIG. 3 is one of several examples for passing a desired frequency band by adjusting the filter function inside the connector 1, so that the number of partitions and the size of the distance may be variously changed at the level of those skilled in the art and the embodiment does not limit the scope of the present disclosure.

Figure 4:
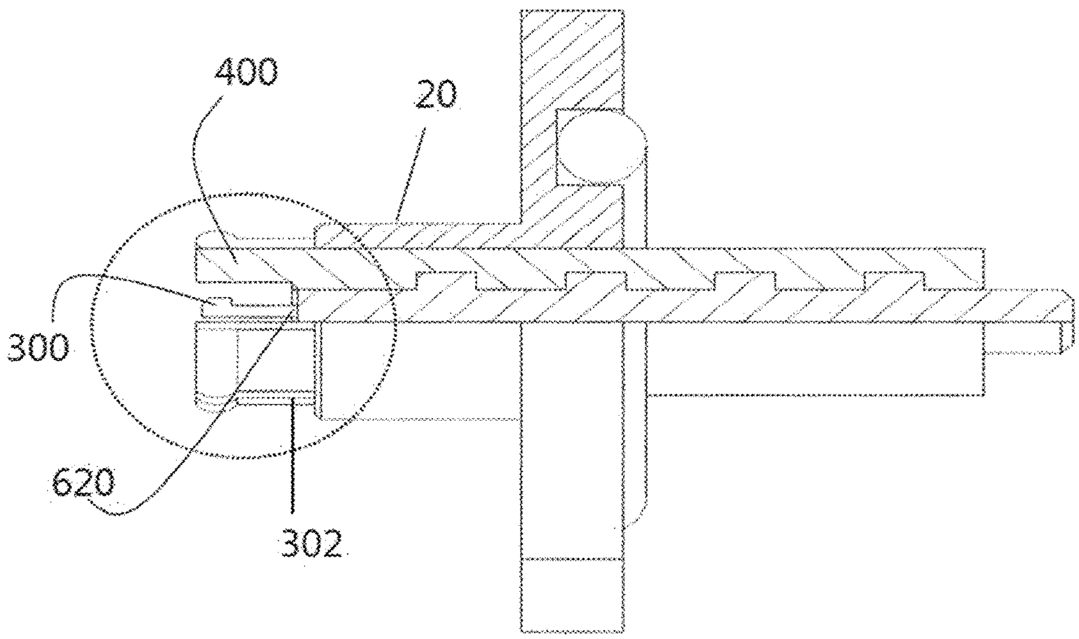
FIG. 4 is a cross-sectional view illustrating a yet another embodiment of the connector with the embedded filter of the present disclosure.
Figure 5:
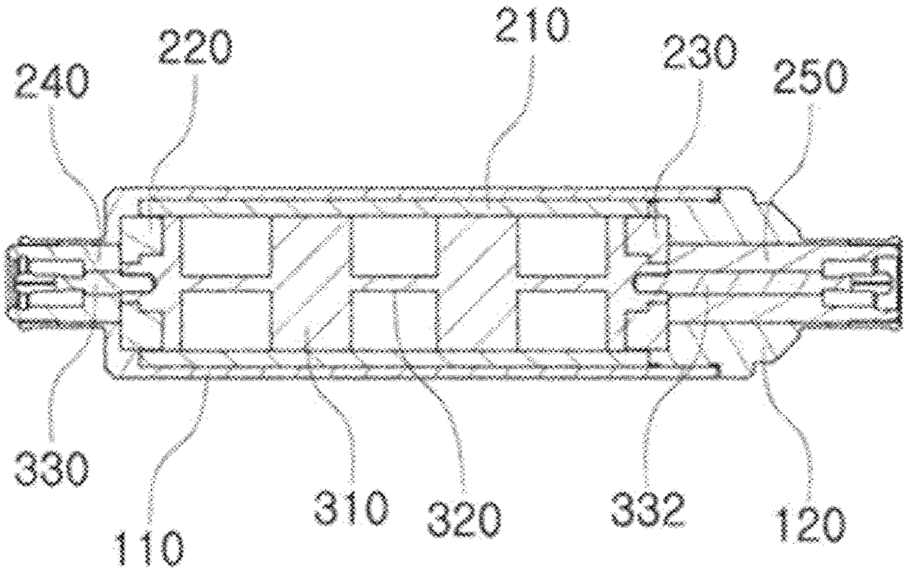
Prior Art FIG. 5
FIG. 5 is a view illustrating an adapter in the related art.

FIG. 4 is a cross-sectional view illustrating a yet another embodiment of the connector 1 with the embedded filter of the present disclosure.

The difference from the previous embodiment is that a circular arc portion in front of the connector 1 is changed to a structure of an adapter. Compared to FIG. 1, the sleeve 20 of the body 2 extends frontward shorter, the step and the front sleeve 680 of the pin 6 are removed, and the front surface of the pin 6 ends by a cross-section 620. On the other hand, the insulator 4 has an exposed portion 400 that extends frontward further beyond the body 2 and the pin 6. a cap portion 302 is formed such that the cap portion 302 surrounds the exposed portion 400 of the insulator 4 from the outside, and a plug 300 extends from the cross-section 620 of the pin 6 to an end of the exposed portion 400. The plug 300 is applied to a male type adapter, and a jack instead of the plug 300 may be formed when an adapter is required to be changed to a female type adapter.

FIG. 4 is a representative example of an adapter structure, and the adapter structure may be appropriately changed according to various adapter types such as an MBX type adapter, an MMBX type adapter, an SMP type adapter, an SMPS type adapter, an SMPM type adapter, and so on.

The connector 1 with the embedded filter of the present disclosure in FIG. 4 has a characteristic that the connector 1 is a "hybrid type" in which the connector 1 adopts a portion of connection structure of an adapter while performing an original function that is the filter function. When the connector 1 in FIG. 4 is used, connectors 1 such as a plug type connector, a jack type connector, and so on for example can be directly connected without a separate adapter, so that the connector 1 may be economical and easy to mount and a module may be miniaturized in a more compact size. In addition, the adapter structure may be formed not only at a front side but also at a rear side of the connector 1 with the embedded filter, and shapes of the pin 6 and the insulator 4 may be changed accordingly.

The present disclosure is not limited to the specific preferred embodiments described above, and any person of ordinary skill in the art to which the present disclosure pertains may implement various modifications without departing from the gist of the present disclosure claimed in the claims. Furthermore, it is obvious that such modifications will fall within the scope of the description of the claims.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A connector with an embedded filter, the connector comprising:

a body having an inner side thereof provided with a space;

an insulator provided at the inner side of the body; and a pin provided inside the insulator, the pin having a stepped multistage structure of at least two stages having different heights;

wherein the pin further has an outer surface, wherein the outer surface has the stepped multistage structure, wherein the outer surface comprises at least one first surface and at least one second surface disposed proximate the inner surface, and wherein the at least one first surface and the at least one second surface are alternately repeated.

2. The connector of claim 1, wherein the insulator is configured such that an inner surface of the insulator facing the pin has a bump structure so as to be complementary to the multistage structure of the pin.

3. The connector of claim 1, wherein the pin and the insulator are accommodated and inserted by predetermined lengths into the space formed at the inner side of the body, and remaining portions of the pin and the insulator are exposed outside.

4. The connector of claim 1, wherein the body extends such that the body covers at least an entire length of the insulator.

5. The connector of claim 1, wherein the pin having the multistage structure is divided into a plurality of pins, and each of the pins divided is spaced apart from each other by a predetermined distance.

6. The connector of claim 1, wherein a front side of the insulator extends further frontward than corresponding portions of the body and the pin such that an exposed portion is formed, a cap portion is formed such that the cap portion surrounds an outer side of the exposed portion, and a plug or a jack is mounted from a cross-section of the pin to an end of the exposed portion.

7. The connector of claim 1, wherein the insulator is configured such that an inner surface of the insulator facing the pin has a bump structure so as to be complementary to the multistage structure of the pin.

8. The connector of claim 1, wherein the at least one first surface is disposed parallel to and spaced from the at least one second surface.

* * * * *